3,368,904
PROCESS FOR MAKING A VISCOSITY STABILIZED
STARCH-CONTAINING PRODUCT
Kenneth J. Young, North St. Paul, and Edward L. Galle,
St. Paul, Minn., assignors to The Pillsbury Company,
Minneapolis, Minn., a corporation of Delaware
Continuation-in-part of application Ser. No. 154,971,
Nov. 27, 1961. This application Dec 28, 1964, Ser.
No. 421,305
5 Claims. (Cl. 99—93)

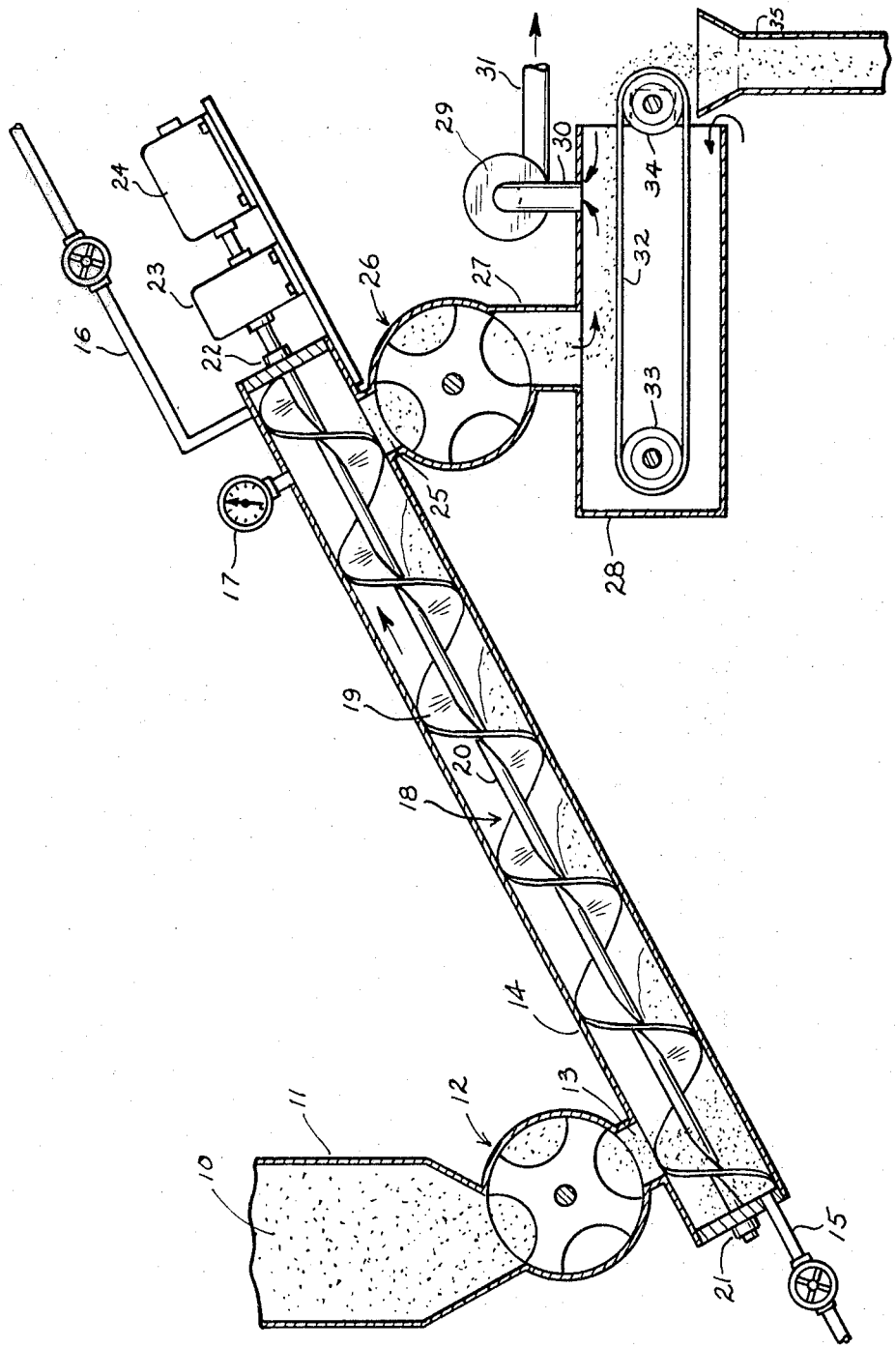

The present application is a continuation-in-part of our prior application bearing the same title having Ser. No. 154,971 filed Nov. 27, 1961, now abandoned.

This invention relates to starch-containing substances and more particularly to the production of a dry cereal product intended to form a viscous solution when mixed with water and heated.

Cereal flour contains a fraction of starch which renders it useful commercially when mixed in a slurry and heated. The wet starch granules are gelatinized by the heat and enter into a suspension which is characterized by its high viscosity and its ability to produce edible jells and fillers, commercial adhesives, sizes, bonding agents and the like. The starch, such as obtained from wheat, rye and barley is, however, subject to degradation by the action in solution of enzymes, particularly alpha and beta amylasses, which naturally occur therein.

In prior art practice, starch may be procured from wheat flour and the like through a wet wash process which removes substantially all of the enzyme present. While the wheat starch thus produced has a persevering viscosity, it is relatively expensive to manufacture. Furthermore, a portion of the available starch is washed out and the yield of the recovered starch is less than the original content.

Another prior art starch product consists of a flour which has been simply heated in a wet condition to the point where the starch granules are gelatinized and hydrolyzed at least in part and the enzymes are inactivated through application of heat.

Even where batches of slurried wheat flour are cooked at high temperatures, such as in pressure cookers, the starch in the slurry becomes partly degraded because of the action of enzymes upon the starch prior to their becoming destroyed or inactivated by the heat. Thus, the same heat which ultimately kills the activity of the enzyme will stimulate the enzymatic degradation of the slurried starch before the enzyme becomes inactivated. Here again, the theoretical viscosity for a given concentration is not reached and less than all of the starch is ultimately available. Also, the cost of redrying the product or packaging and shipping a paste or slurry formed therefrom is high as compared to the expense involved in producing and handling starch in dry form.

It is, therefore, within the contemplation of the present invention and a general object thereof to overcome the above noted difficulties in connection with the production, manufacture and use of dry cereal product of the type wherein natural enzymes present tend to degrade the starch portion and thereby to lower the viscosity of water suspensions thereof and to provide an inexpensive and reliable viscosity stabilized product therefrom.

A further object of the invention is to provide a process by which a cereal flour can, without removing any of its components, be treated so as to remain a substantially dry material capable of yielding a highly viscous and stable product when it is ultimately formed into either a hot or cool slurry by the user.

Another object is to produce such a stable starch product without requiring the use of chemical reagents.

A still further object of the invention is to provide a novel cereal flour product by the herein disclosed process, which product is characterized by the presence of all the components of a dry flour, or a starchy mill fraction thereof, and in which the protein fraction is denatured, the starch is not gelatinized or hydrolyzed (i.e. modified) until subsequently cooked, and the starch-degrading enzymes naturally present among the components have been substantially inactivated.

These and other objects and advantages will become apparent from the following description taken in conjunction with the accompanying drawing in which the single view shows a diagrammatic representation of equipment capable of carrying out the process of the present invention and yielding the stabilized dry flour product as disclosed herein.

With continued reference to the drawing, a starchy milled cereal product, such as wheat flour 10, is fed from hopper 11 to air lock valve 12 which releases a measured flow of material 10 through inlet 13 and into pressure barrel 14. The pressure barrel 14 has a valved steam inlet pipe 15 and a valved vapor outlet pipe 16 whereby the pressure barrel 14 can be supplied with a constant steam pressure as indicated on the pressure gauge 17.

An auger 18 is provided with flights 19 secured to central shaft 20 which, in turn, is journaled at 21 in the lower end of the pressure barrel 14 and at 22 at the upper end thereof. Shaft 20 extends through the upper journal 22 and is drivably connected to a gear reducer 23, driven in turn by an electric motor 24. As is clearly shown in the figure, the material being treated is located in a plurality of longitudinally spaced piles. A slight mixing action will obviously occur as the material is moved toward outlet pipe 16. By "slight mixing" we mean that the particles make random contact with one another as one portion of the material is moved over another portion. Above the piles are spaces within which pressurized steam is present as clearly shown. At the upper surface of each pile is an interface between the steam and the material being treated.

An outlet 25 is located adjacent the upper end of pressure barrel 14 and connects with an air lock feed 26 which, in turn, discharges through tube 27 into chamber 28 provided with a suction blower 29 for drawing moist air through conduit 30 and discharging it through tube 31. A means such as traveling belt 32 is disposed within the chamber 28 and entrained around rollers 33 and 34 for discharging the treated wheat material into a receiver 35.

In carrying out the invention, several types of milled cereal products may be employed and, in the case of wheat, it has been found that the process can satisfactorily stabilize both soft and hard wheat flours including various mill fractions thereof. The cereal material 10 is fed at a rate such that its travel through the pressure barrel 14 is accomplished in approximately one minute. While treatments for lesser and longer times have been found to give satisfactory results in some instances, one minute under the conditions herein noted will instantaneously heat and substantially inactive the enzyme content as evidenced by the following examples.

Steam is admitted through the valved inlet pipe 15 so as to create a continuous pressure of twenty pounds per square inch above atmospheric pressure within the barrel 14. The corresponding temperature as set forth for example in Chemical Engineers Handbook, McGraw-Hill, 1950, p. 277, is about 259° F., which temperature for one minute is usually adequate to inactivate the enzymes in a cereal product without any appreciable rupturing of the starch cells. While longer or shorter periods of treatment have been used, it has been found desirable to minimize the time of treatment, consistent with effective inactivation of the enzymes so as to preserve the original condition of the individual starch granules. The protein, which is in minor proportion, is simply denatured by the treatment and remains as an inert material. With a treatment time of thirty seconds at a pressure of thirty pounds per square inch, the maltose value of one flour was reduced from 201 (14% moisture basis) in the control to 37 thus indicating enzyme inactivation. Under the same conditions the peak viscosity was increased from an amylograph value of 380 in the control to about 765 as shown in Example VII.

As shown in Examples VIII and IX, substantial changes in maltose value which indicate a change in viscosity are also obtained at treatment times of about 3 seconds at as little as 5 pounds per square inch. Thus, in Example IX a treatment of 5 pounds per square inch for 3 seconds reduced the maltose value (B.S.U.) from 429 to 340. In Example VIII an 8 second treatment at the same pressure reduced the maltose value of a flour from 170 to 125.

While it is preferred that treatment be performed at from about 18 to 22 pounds per square inch (254° F.–264° F.) for a period of from thirty seconds to one minute, treatment can be as little as 5 seconds or prolonged (at a sacrifice in production speeds) up to an hour or more and pressure can be varied between about 5 pounds per square inch (228° F.) and 30 pounds per square inch.

At lower pressures and lesser times such as those described in Examples VIII and IX enzyme inactivation although incomplete is significant but the product is still suitable for less demanding applications. As in the case of more prolonged treatment, only a negligible amount of agglomeration takes place so that the treated product need not therefore be reground.

Since the flour 10 is normally at a lower temperature within the feed hopper 11 than when it is being elevated within pressure barrel 14, a small amount of condensation from the injected steam can be anticipated. The amount of added moisture, however, is slight and serves to assist in the inactivation of the enzyme present. As the hot flour is transferred from the pressure barrel 14 to the air lock discharge mechanism 26, it is dropped by gravity onto the belt 32 and into atmospheric pressure such that the amount of moisture present in the flour at this point will tend to flash from the flour in the form of vapor. A substantial amount of moisture is thus removed suddenly before the particles are cooled. This is believed to be a significant factor in preventing adhesion between the particles. In order to remove the vapor and prevent recondensation thereof, the blower 29 causes air to be swept over the belt and out of the pipe 31 to leave the treated flour with substantially the same moisture content as it had in the beginning. For all practical purposes, the product is considered a "dry" flour material containing all of the original components but with the enzyme fraction being substantially inactivated. Surprisingly, with the present invention only a very minor amount of the finished product, if any, is present in the form of agglomerates or lumps. For this reason the finished product need be neither milled nor reground thereby increasing production efficiency and decreasing processing time and costs.

The inactivation of amylase is evidenced by the preservation of viscosity in water suspensions of the treated wheat product under various conditions of time and temperature as compared with similar tests of the same flour untreated by the present method. The procedure which is employed to test the viscosity may be the so called "Three Hour Corn Products Amylograph Tests", Schoch et al., as set forth in Cereal Chemistry, Volume 34, No. 3, 1957, and utilizing a viscosimeter manufactured by C. W. Brabender Instrument Company. Illustrative examples are given as follows:

EXAMPLE I.—SECOND CLEAR SOFT WHEAT FLOUR, 11.5% PROTEIN 9.1% CONCENTRATION

[Dry weight basis]

| | Amylograph Units | |
|---|---|---|
| | Untreated | Steam Treated One Minute at 20 p.s.i. |
| Initial peak viscosity | 240 | 340 |
| Viscosity at 95° C | 125 | 310 |
| Viscosity after one hour at 95° C | 100 | 345 |
| Viscosity at 50° C | 340 | 680 |
| Viscosity after one hour at 50° C | 280 | 570 |

EXAMPLE II.—REDUCED PROTEIN HARD WHEAT FLOUR, 9.5% PROTEIN 9.1% CONCENTRATION

[Dry weight basis]

| | Amylograph Units | |
|---|---|---|
| | Untreated | Steam Treated One Minute at 20 p.s.i. |
| Initial peak viscosity | 370 | 535 |
| Viscosity at 95° C | 340 | 520 |
| Viscosity after one hour at 95° C | 360 | 580 |
| Viscosity at 50° C | 780 | 960 |
| Viscosity after one hour at 50° C | 730 | 920 |

EXAMPLE III.—HARD WHEAT SECOND CLEAR FLOUR 12.5% PROTEIN 9.1% CONCENTRATION

[Dry weight basis]

| | Amylograph Units | |
|---|---|---|
| | Untreated | Steam Treated One Minute at 20 p.s.i. |
| Initial peak viscosity | 325 | 325 |
| Viscosity at 95z C | 220 | 320 |
| Viscosity after one hour at 95z C | 230 | 315 |
| Viscosity at 50° C | 480 | 675 |
| Viscosity after one hour at 50° C | 370 | 520 |

EXAMPLE IV.—SOFT WHEAT FLOUR, SPECIAL 3% PROTEIN 8.2% CONCENTRATION

[Dry weight basis]

| | Amylograph Units | |
|---|---|---|
| | Untreated | Steam Treated One Minute at 20 p.s.i. |
| Initial peak viscosity | 205 | 285 |
| Viscosity at 95° C | 170 | 280 |
| Viscosity after one hour at 95° C | 185 | 340 |
| Viscosity at 50° C | 360 | 680 |
| Viscosity after one hour at 50° C | 480 | 580 |

Further illustrative examples are given on similar tests wherein the cereal employed was rye and barley respectively.

EXAMPLE V.—RYE FLOUR, 10.79% PROTEIN 8.2% CONCENTRATION

[Dry weight basis]

| | Amylograph Units | |
|---|---|---|
| | Untreated | Steam Treated Until Maximum Temperature of 250° F.[1] Reached |
| Initial peak viscosity | 50 | (²) |
| Viscosity at 95° C | 20 | 220 |
| Viscosity after one hour at 95° C | 20 | 320 |
| Viscosity at 50° C | 50 | 740 |
| Viscosity after one hour at 50° C | 60 | 670 |

[1] The corresponding pressure is 15 p.s.i. as shown for example in Chemical Engineers Handbook, McGraw-Hill 1950, pg. 277.
² No peak.

EXAMPLE VI.—BARLEY FLOUR, 11.37% PROTEIN 7.2% CONCENTRATION

[Dry weight basis]

| | Amylograph Units | |
|---|---|---|
| | Untreated | Steam Treated Until Maximum Temperature of 250° F.[1] Reached |
| Initial peak viscosity | 200 | 365 |
| Viscosity at 95° C | 195 | 360 |
| Viscosity after one hour at 95° C | 160 | 280 |
| Viscosity at 50° C | 420 | 670 |
| Viscosity after one hour at 50° C | 380 | 600 |

[1] The corresponding pressure is 15 p.s.i. as shown for example in Chemical Engineers Handbook, McGraw-Hill 1950, pg. 277.

EXAMPLE VII.—UNBLEACHED SPRINGFIELD WHEAT FLOUR, 11.58% PROTEIN ASH .985%

[Dry weight basis]

| | Amylograph Units | |
|---|---|---|
| | Untreated | Steam Treated at 30 p.s.i. (274° F.) for 30 Seconds |
| Initial peak viscosity | 380 | (¹) |
| | Maltose Value (14% moisture value) | |
| Maltose value B.S.U | 201 | 37 |

¹ 765 and rising.

EXAMPLE VIII.—SOFT UNBLEACHED WHEAT FLOUR (OGDEN), PROTEIN 9.46%, ASH .515%

| | Untreated | Treated | | |
|---|---|---|---|---|
| | Test 40-C | Value | Conditions | Test No. |
| Maltose Value B.S.U | 170 | 120 | 10 p.s.i. for 5 sec | 44-3 |
| | | 125 | 5 p.s.i. for 8 sec | 45-6 |

EXAMPLE IX.—HARD SPRING WHEAT FLOUR, MALTED PROTEIN 12.66%, ASH .515%

| | Untreated | Treated | | |
|---|---|---|---|---|
| | Test 41-C | Value | Conditions | Test No. |
| Maltose Value B.S.U | 429 | 207 | 10 p.s.i. for 12 sec | 44-5 |
| | | 361 | 10 p.s.i. for 3 sec | 44-8 |
| | | 291 | 5 p.s.i. for 12 sec | 45-9 |
| | | 340 | 5 p.s.i. for 3 sec | 45-12 |

In each of the preceding examples, it will be noted that the treated product consistently maintained a higher viscosity, particularly after heating and holding and after subsequent cooling. Since starch products are usually employed after heating to gelatinize the starch granules in aqueous suspension, the effect of any enzyme present becomes evident in a very short time. Heating the material with enzyme present accelerates the enzymatic action and causes starch granules to be converted to less viscous substances such as dextrins. For this reason, the aqueous suspension loses its high viscosity even when cooled to a lower temperature, as is evident from the cited examples. The same products, when treated according to the instant invention, in each case maintain a relatively higher viscosity both when heated and when cooled under the same conditions.

The continuous procedure employed herein makes it possible to limit the treatment of the flour to such a short time as will permit inactivation of the enzymes, yet substantially preserve the original form of the starch granules, so that a dry food or starch base will result without the necessity of an intermediate slurrying or washing out of the enzyme fraction.

We claim:

1. A process for making a dry product from a natural cereal flour which comprises subjecting the flour, in a substantially normally dry state, rapidly to pressurized steam having a pressure of about 5–30 pounds per square inch above atmospheric pressure and a temperature of approximately 228–274° F., holding the pressure for at least 5 seconds to substantially inactivate the starch degrading enzymes contained therein without substantially modifying the granular starch component of the flour, and then removing the pressure and flash drying the product to substantially its original condition of dryness.

2. A process for treating wheat, rye and barley flour to provide a dry product which when suspended in water and subjected to temperatures sufficient to gelatinize the starch contained therein will maintain its viscosity, which comprises intimately contacting said flour, in a substantially normally dry state, and steam at a temperature in the range of 250°–274° F. and above atmospheric pressure in the range of 15–30 p.s.i.g. for a time of at least thirty seconds, to substantially inactivate the starch degrading enzymes contained therein without substantially modifying the granular starch component of the flour, and drying said flour to a moisture content no greater than the moisture content of the flour prior to treatment.

3. A process for treating wheat, rye and barley flour to provide a dry product which when suspended in water and subjected to temperatures sufficient to gelatinize the starch contained therein will maintain its viscosity, which comprises intimately contacting said flour, in a substantially normally dry state, and steam at a temperature in the range of 250°–274° F. and above atmospheric pressure in the range of 15–30 p.s.i.g. for a time of at least thirty seconds, to substantially inactivate the starch degrading enzymes contained therein without substantially modifying the granular starch component of the flour, while slightly mixing said flour whereby the particles make random contact as a portion of said flour moves over another portion and drying said flour to a moisture content no greater than the moisture content of the flour prior to treatment.

4. A process for treating wheat, rye and barley flour to provide a dry product which when suspended in water and subjected to temperatures sufficient to gelatinize the starch contained therein will maintain its viscosity, which comprises intimately contacting said flour, in a substantially normally dry state, and steam at a temperature in the range of 254°–264° F. and above atmospheric pressure in the range of 18–22 p.s.i.g. for a time of at least thirty seconds, to substantially inactivate the starch degrading enzymes contained therein without substantially modifying the granular starch component of the flour, while slightly mixing said flour whereby the particles make random contact as a portion of said flour moves over another portion and drying said flour to a moisture content no greater than the moisture content of the flour prior to treatment.

5. A process for making a dry substantially unagglomerated product from a natural cereal flour which comprises subjecting the flour, in a substantially normally dry state, rapidly to pressurized steam having a pressure of about 18–22 p.s.i.g. above atmospheric pressure and a temperature of approximately 254°–264° F., holding the pressure for at least 5 seconds to substantially inactivate the starch degrading enzymes contained therein without substantially modifying the granular starch component of the flour while slightly mixing said flour whereby the particles make random contact as a portion of said flour moves over another portion and then removing the pressure and flash drying the product to substantially its original condition of dryness.

References Cited

UNITED STATES PATENTS 3,133,818    5/1964    Gould et al. _____ 99—93 X

RAYMOND N. JONES, *Primary Examiner.*